US008723864B2

(12) United States Patent
Tsai et al.

(10) Patent No.: US 8,723,864 B2
(45) Date of Patent: May 13, 2014

(54) PRE-CULLING PROCESSING METHOD, SYSTEM AND COMPUTER READABLE MEDIUM FOR HIDDEN SURFACE REMOVAL OF IMAGE OBJECTS

(75) Inventors: Tsung-Yu Tsai, New Taipei (TW); Chiu-Hung Wu, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 466 days.

(21) Appl. No.: 13/116,682

(22) Filed: May 26, 2011

(65) Prior Publication Data

US 2012/0147005 A1 Jun. 14, 2012

(30) Foreign Application Priority Data

Dec. 14, 2010 (TW) .............................. 99143644 A

(51) Int. Cl.
*G06T 15/40* (2011.01)

(52) U.S. Cl.
USPC .......................................... 345/421; 345/420

(58) Field of Classification Search
USPC ......................................... 345/421, 427, 420
See application file for complete search history.

(56) References Cited

U.S. PATENT DOCUMENTS 6,163,319 A * 12/2000 Peercy et al. ................. 345/426
2002/0118188 A1* 8/2002 Zviaguina et al. ............ 345/421
2008/0062197 A1* 3/2008 Bi et al. ....................... 345/621

* cited by examiner

*Primary Examiner* — Maurice L McDowell, Jr.
(74) *Attorney, Agent, or Firm* — McClure, Qualey & Rodack, LLP

(57) ABSTRACT

A pre-culling method for the hidden surface removal of image objects is disclosed. The steps of the pre-culling method includes: transforming an eye coordinate from an eye space to a model space of a polygon when performing a rendering operation; and comparing a normal vector of the eye coordinate in the model space with the normal vector of each face of the polygon to determine whether each face of the polygon with respect to the eye coordinate is a front face or a back face.

12 Claims, 9 Drawing Sheets

PRE-CULLING PROCESSING METHOD, SYSTEM AND COMPUTER READABLE MEDIUM FOR HIDDEN SURFACE REMOVAL OF IMAGE OBJECTS

CROSS REFERENCE TO RELATED APPLICATIONS

This Application claims priority of Taiwan Patent Application No. 99143644, filed on Dec. 14, 2010, the entirety of which is incorporated by reference herein.

BACKGROUND OF THE INVENTION

1. Field of the Invention

The present invention relates to hidden surface removal technology and in particular relates to a pre-culling method and system for the hidden surface removal of image objects.

2. Description of the Related Art

Hidden surface removal is a crucial subject in the graphics rendering pipeline and its concept is that "when rendering a three-dimensional object, the back part of the object is usually covered by the front part. As a result, only the part viewed is rendered, and the part not viewed is not rendered. Thus, the rendering speed can be increased". That is, if a polygon is rendered on a target object through a graphics rendering pipeline, pixels belonging to the polygon will not be observed by human eyes, and thus the process for rendering the polygon is redundant and can be removed.

Culling is one type of hidden surface removal algorithm, and the concept behind culling is to transform the coordinates of a polygon to an eye space. If the angle between the normal of a face of the polygon and the normal of the human eyes is larger than 90 degrees, it indicates that the face is a front face. Contrarily, if the angle is smaller than 90 degrees, it indicates that the face is a back face, as illustrated in FIG. 1. Thus, the transmission of the polygon into the graphics pipeline in the hardware can be determined according to the settings provided by the device driver interface (DDI). That is, the direction of a polygon can be predicted to be from a viewpoint which is seen or not, according to the position and the direction of human eyes.

The deficiencies of conventional culling methods include the following:

(1) Only working in an eye space. That is, an operation for the coordinates transformation and lighting should be performed before the calculation of culling. If a polygon can be predicted as being removable in advance, a culling calculation of the polygon would be regarded as redundant, if executed.

(2) Real-time calculation for the angle between the normal of the human eyes and the normal of each face of the polygon is required. Generally, the calculation for the angle can be expressed as: $((x1-x0)\times(y2-y0))>((x2-x0)\times(y1-y0))$, which requires six floating point numbers, two multiplication instructions, four subtraction instructions and one comparison instruction, which are complex and time-consuming

BRIEF SUMMARY OF THE INVENTION

A detailed description is given in the following embodiments with reference to the accompanying drawings. A pre-culling method and system for the hidden surface removal of image objects are provided in the invention, which in particular, relates to an improved culling method.

A pre-culling method for the hidden surface removal of image objects is disclosed in the invention. The steps of the pre-culling method includes: transforming an eye coordinate from an eye space to a model space of a polygon when performing a rendering operation; and comparing a normal vector of the eye coordinate in the model space with the normal vector of each face of the polygon to determine whether each face of the polygon with respect to the eye coordinate is a front face or a back face.

A pre-culling system for the hidden surface removal of image objects is further disclosed in the invention. The pre-culling system comprises: a transformation unit for transforming an eye coordinate from an eye space to a model space of a polygon; a calculating unit for calculating a normal vector of the eye coordinate in the model space; a determination unit for comparing the normal vector of the eye coordinate with a normal vector corresponding to each face of the polygon to determine whether each face of the polygon with respect to the eye coordinate is a front face or a back face; and a rendering unit for removing the face of the polygon in the model space without rendering when the face of the polygon is determined as the back face.

A non-transitory computer-readable medium storing a computer program is disclosed in the invention, wherein the computer program comprises a plurality of program codes for being loaded into a computer system to execute a pre-culling method for the hidden surface removal of image objects. The non-transitory computer-readable medium comprises: transforming a eye coordinate from a eye space to a model space of a polygon when executing a rendering operation; comparing a normal vector of the eye coordinate in the model space with a normal vector of each face of the polygon to determine whether each face with respect to the eye coordinate is a front face or a back face; and when the face of the polygon is determined as the back face, removing the face in the model space without rendering.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A pre-culling hidden surface removal method and system is disclosed in the invention. According to an embodiment, the pre-culling method for the hidden surface removal of image objects is a pre-calculated culling index (hereinafter PCCI) method which can be calculated in the model space to reduce the operations for coordinates transformation and lighting, and does not require execution of cross operations in real-time rendering to reduce the complexity of calculations, and can be implemented by hardware and software.

Figure 1:
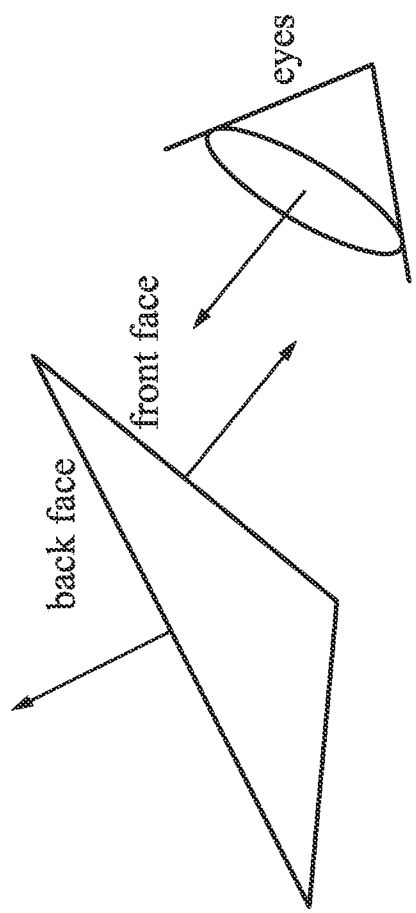
FIG. 1 illustrates a front face and a back face of a polygon.
Figure 2:
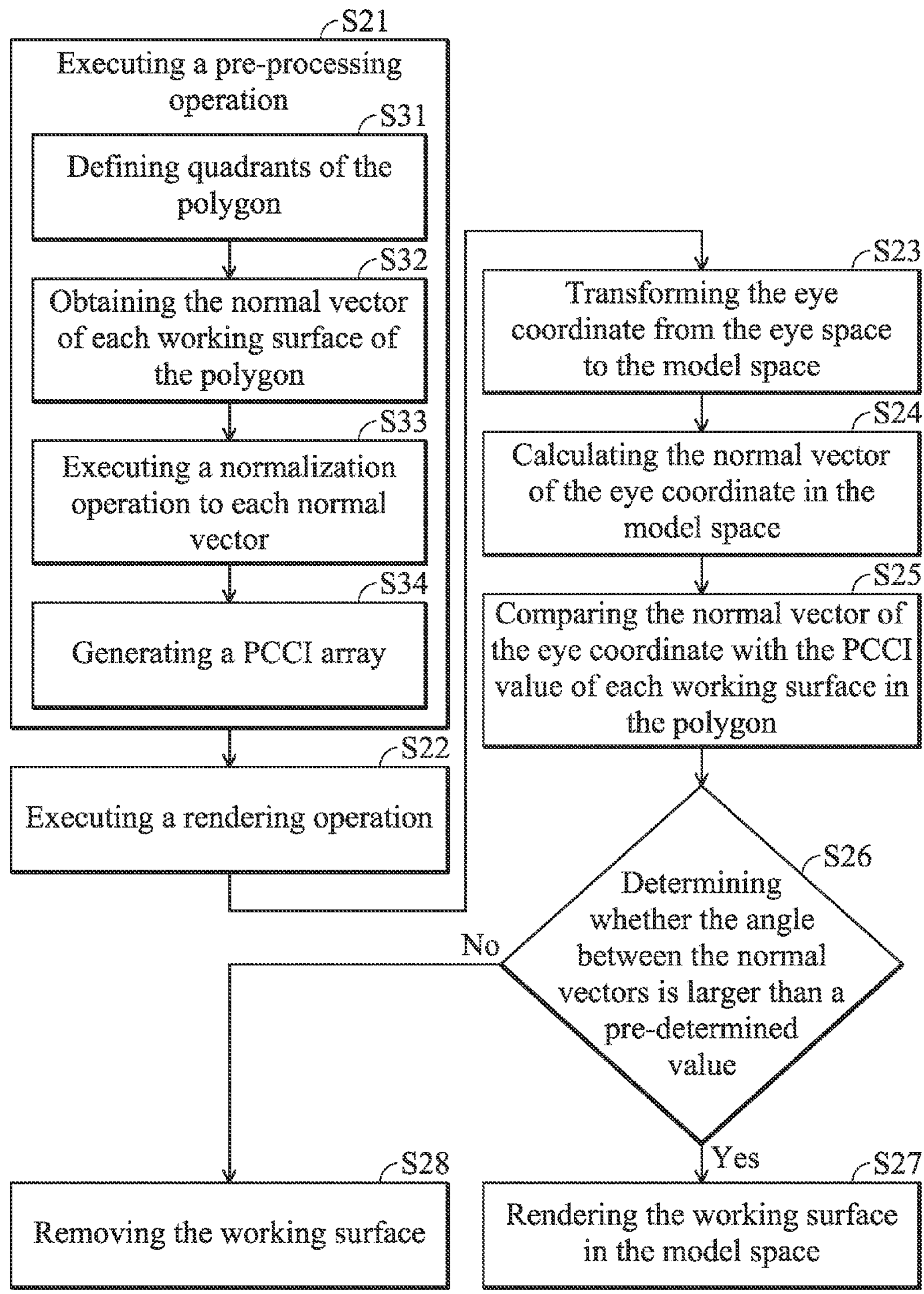
FIG. 2 illustrates a flowchart of the pre-culling method for the hidden surface removal of image objects according to an embodiment of the invention.

FIG. 2 illustrates a flowchart of the pre-culling method for the hidden surface removal of image objects according to one embodiment of the invention.

In step S21, an off-line operation (pre-processing operation) is executed, which includes the following steps. In step S31, multiple quadrants for a polygon in the model space are defined according to the direction of the normal vector of each face of the polygon. In step S32, calculating the normal vectors of each face of the polygon by a cross operation. In step S33, a normalization operation is executed to each normal vector. In step S34, after the normalization operation, each normal vector is classified according to the defined quadrants to obtain a PCCI value corresponding to the normal vector of each face of the polygon and to generate a PCCI array. The PCCI array is stored in a memory. The vertex data corresponding to each face of the polygon is stored in a vertex buffer (VB). The index values corresponding to the vertex data of the polygon is stored in an index buffer (IB).

Figure 3:
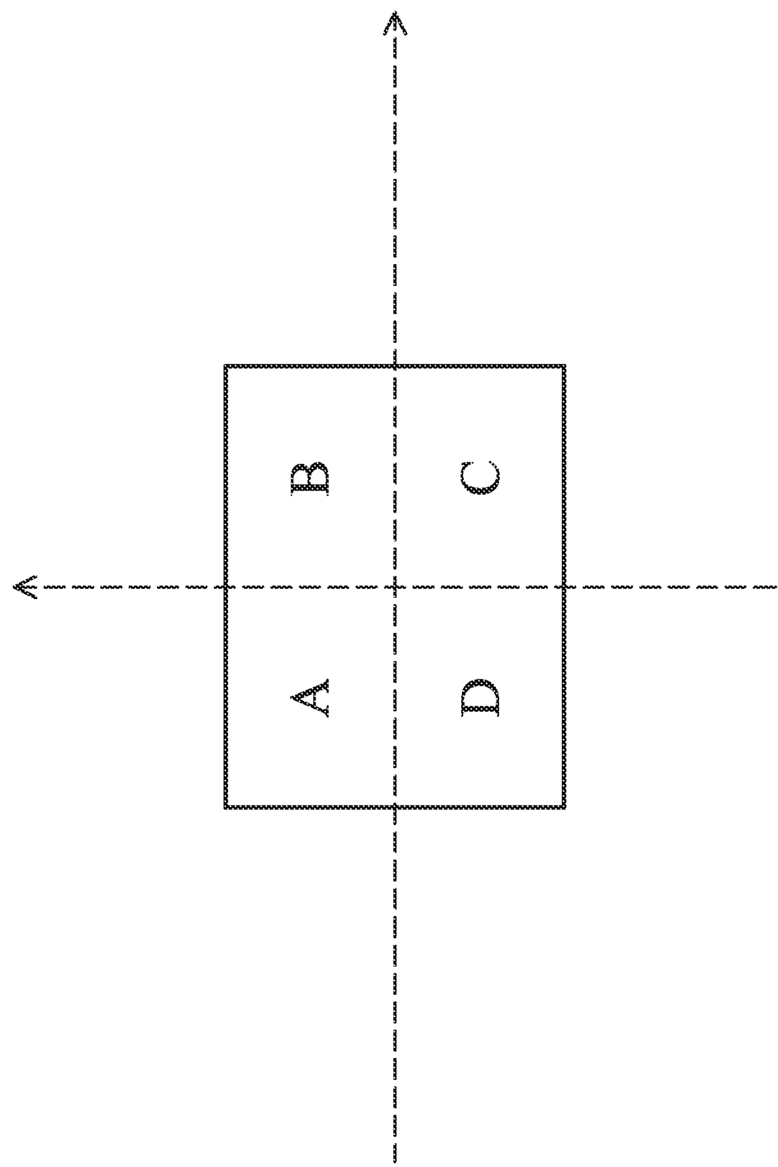
FIG. 3 illustrates a quadrant dividing diagram according to an embodiment of the invention.

Quadrant dividing and the PCCI array are further explained as the following. If quadrants A, B, C and D are defined, as illustrated in FIG. 3, the calculated normal vector of each face of the polygon is classified into quadrants A, B, C, and D to generate the corresponding PCCI array.

Figure 4A:
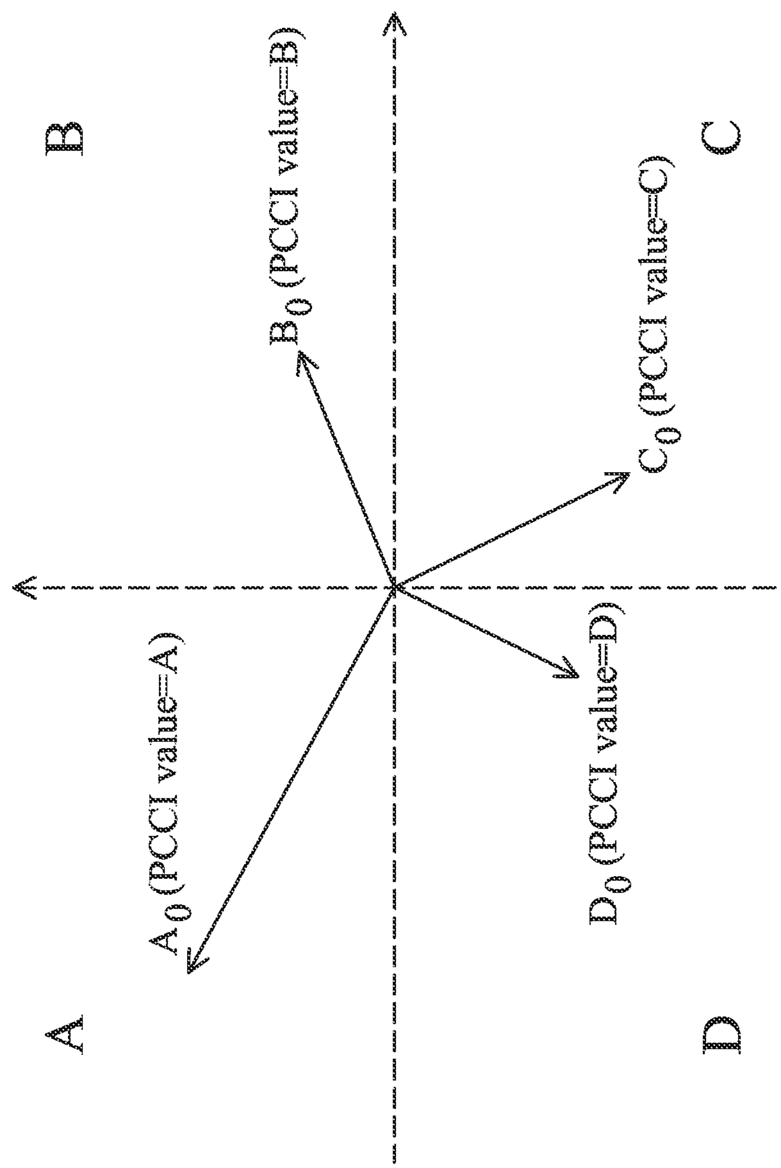
FIG. 4A illustrates a quadrant classification diagram according to an embodiment of the invention.

Further, FIG. 4 illustrates a quadrant diagram of a top view of a cube. If a polygon is divided into quadrants A, B, C and D, taking quadrant A for example, as long as the normal vector of a face is inside the range of quadrant A, the face is classified as quadrant A. Taking quadrant B for example, if the normal of a face is inside the range of quadrant B, the face is classified as quadrant B. Taking quadrant C for example, if the normal of a face is inside the range of quadrant C, the face is classified as quadrant C. Taking quadrant D for example, if the normal of a face is inside the range of quadrant D, the face is classified as quadrant D. Consequently, the face with the normal $A_0$ is classified as quadrant A, and the generated PCCI value is expressed as A. The face with the normal $B_0$ is classified as quadrant B, and the generated PCCI value is expressed as B. The face with the normal $C_0$ is classified as quadrant C, and the generated PCCI value is expressed as C. The face with the normal $D_0$ is classified as quadrant D, and the generated PCCI value is expressed as D.

Figure 4B:
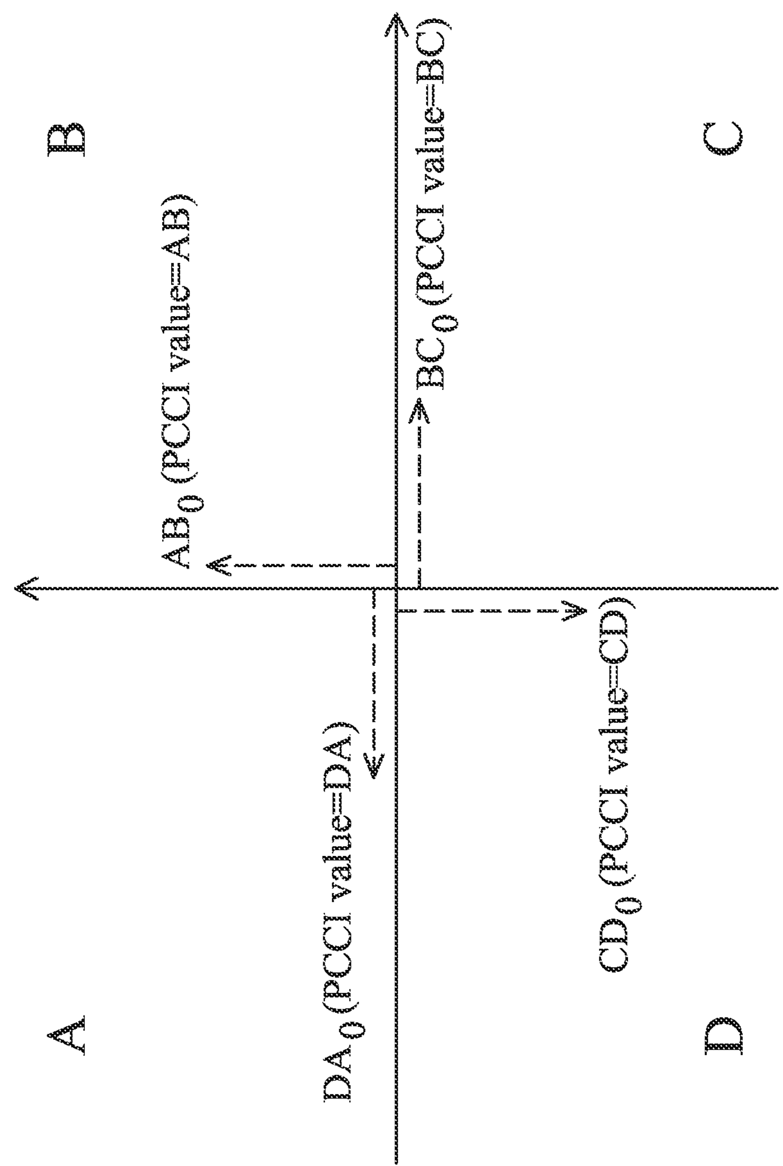
FIG. 4B illustrates a quadrant classification diagram according to another embodiment of the invention.
Figure 5:
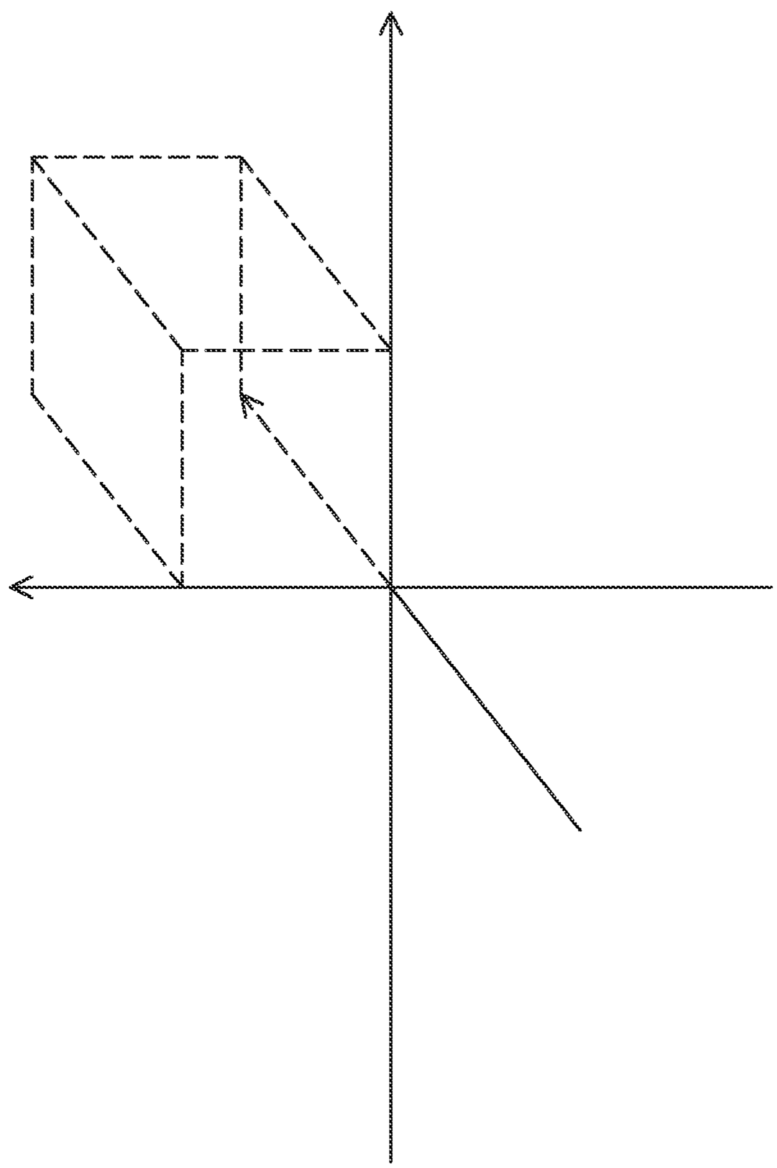
FIG. 5 illustrates a quadrant dividing diagram according to another embodiment of the invention.
Figure 6:
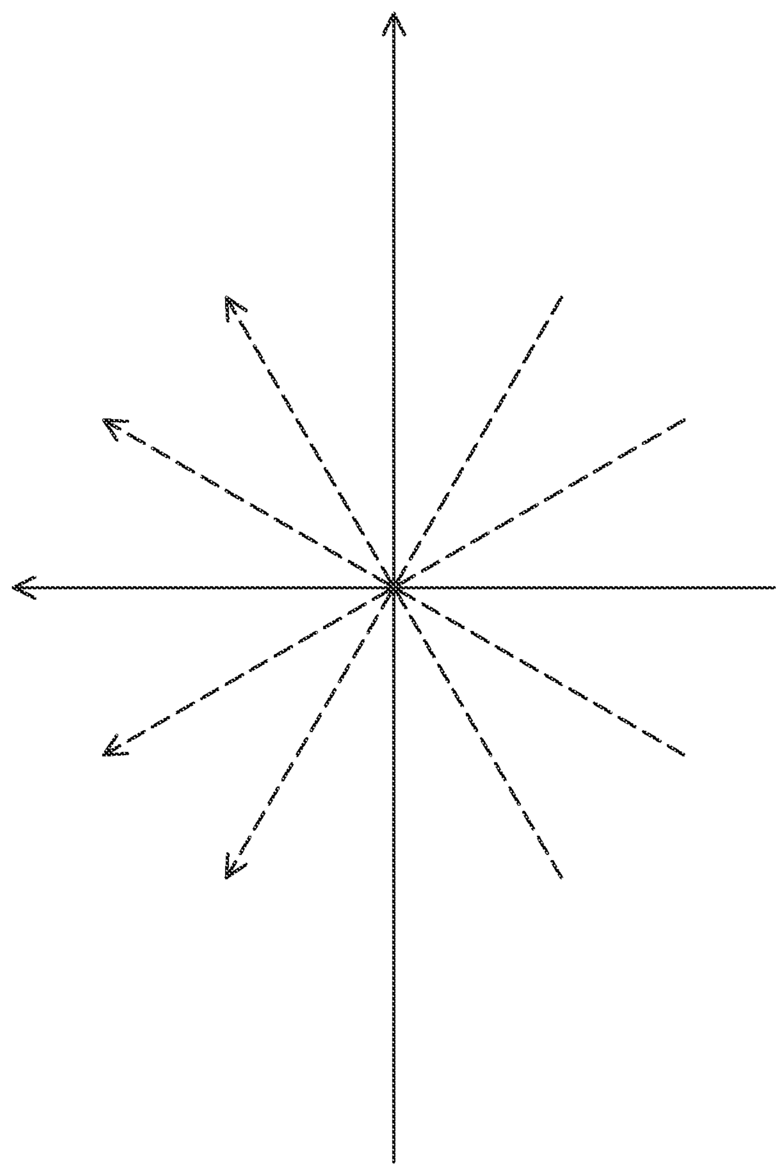
FIG. 6 illustrates a quadrant dividing diagram according to another embodiment of the invention.

Referring to FIG. 4B, taking quadrant A and B for example, if the normal of a face is parallel to the boundary between quadrant A and B, the face is classified as crossing quadrants A and B. Taking quadrant B and C for example, if the normal of a face is parallel to the boundary between quadrant B and C, the face is classified as crossing quadrants B and C. Taking quadrant C and D for example, if the normal of a face is parallel to the boundary between quadrant C and D, the face is classified as crossing quadrants C and D. Taking quadrant D and A for example, if the normal of a face is parallel to the boundary between quadrant D and A, the face is classified as crossing quadrants D and A. Consequently, the face with the normal $AB_0$ is classified as quadrant A and B, and the generated PCCI value is expressed as AB. The face with the normal $BC_0$ is classified as quadrant B and C, and the generated PCCI value is expressed as BC. The face with the normal $CD_0$ is classified as quadrant C and D, and the generated PCCI value is expressed as CD. The face with the normal $DA_0$ is classified as quadrant D and A, and the generated PCCI value is expressed as DA.

Practically, it is not necessary to have only four quadrants and the number of quadrants can be increased or decreased according to requirements. If fewer quadrants are divided, it indicates smaller array space for storing PCCI values is required. For example, if four quadrants are divided, the element in each PCCI array only takes 3 bits. As a result, a smaller number of divided quadrants can save storage space and reduce the memory bandwidth.

Figure 7:
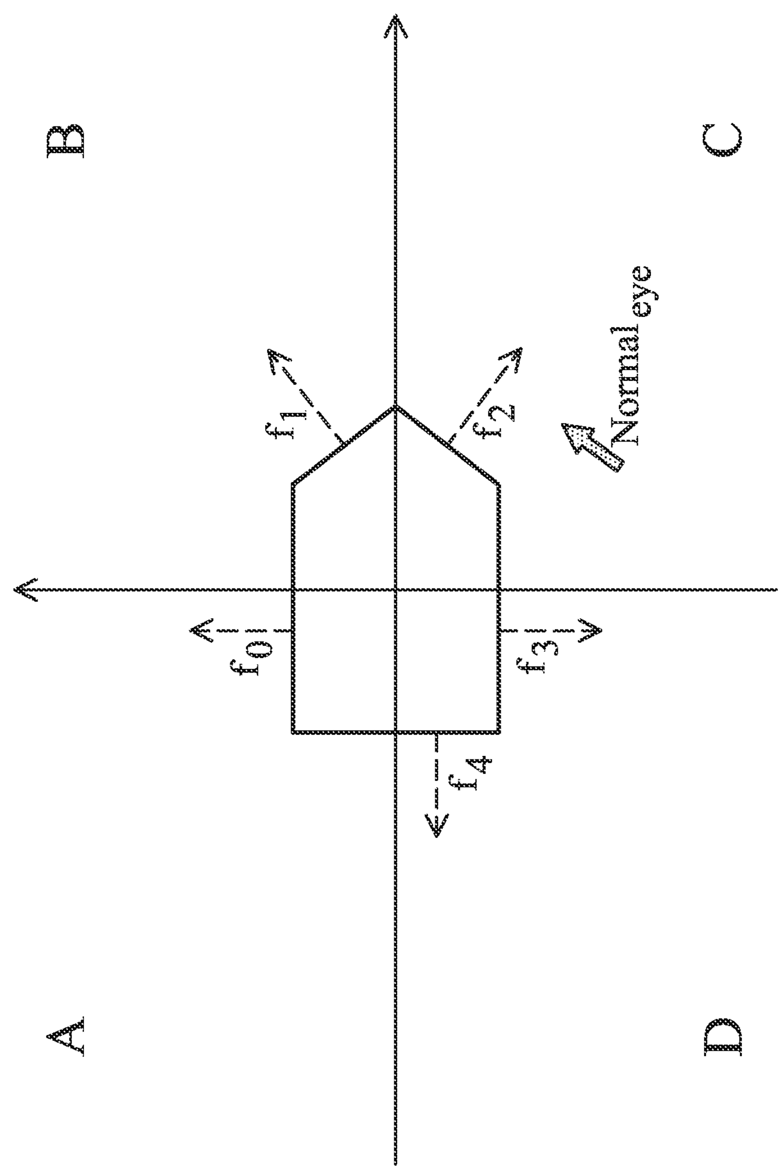
FIG. 7 illustrates a quadrant dividing diagram of a pentagon according to an embodiment of the invention.

Further, FIG. 7 illustrates a diagram of divided quadrants of a pentagon according to an embodiment of the invention. The five faces of the pentagon are $f_0$, $f_1$, $f_2$, $f_3$ and $f_4$, and the pentagon is divided in to four quadrants A, B, C and D. As a result, the values in PCCI arrays are AB, B, C, DC and AD which correspond to the faces $f_0$, $f_1$, $f_2$, $f_3$, and $f_4$, respectively, wherein the values AB, DC, and AD express that the normal corresponding to the face of the polygon is parallel to the boundary of two corresponding quadrants.

In step S22, an on-line rendering operation is performed. In step S23, the eye coordinate is transformed from the eye space to the model space of the polygon. In step S24, the normal vectors of the eye coordinate in the model space is calculated to determine which quadrant of the polygon the normal vector of the eye coordinate belongs to. A model view projection (hereinafter MVP) inverse matrix is used to transform the eye position to the model space of the polygon, and the normal vector of the eye coordinate is obtained according to the MVP inverse matrix. The following example explains the calculation procedure of the MVP inverse matrix ($(MVP)^{-1}$).

Let the normal vector of the eye coordinate be $Normal_{eye}=(x,y,z)$, and the calculation to transform $Normal_{eye}$ to the model space is $Normal_{eye}'=Normal_{eye}\times(MVP)^{-1}$.

Let $$MVP = \begin{bmatrix} 0.36 & 0.48 & -0.8 \\ -0.8 & 0.6 & 0 \\ 0.48 & 0.64 & 0.6 \end{bmatrix},$$

and then $$(MVP)^{-1} = \begin{bmatrix} 0.36 & -0.8 & 0.48 \\ 0.48 & 0.6 & 0.64 \\ -0.8 & 0 & 0.6 \end{bmatrix}.$$

Thus, the $$Normal'_{eye} = \begin{bmatrix} x \\ y \\ z \end{bmatrix}^T \begin{bmatrix} 0.36 & -0.8 & 0.48 \\ 0.48 & 0.6 & 0.64 \\ -0.8 & 0 & 0.6 \end{bmatrix}$$

Note that the direction vector of the camera in the eye space can be regarded as (0, 0, +z). That is, $Normal_{eye}=(0, 0, +z)$.

In the invention, it is not limited to use the MVP inverse matrix to calculate the normal vector of the eye coordinate in the model space, and other methods, such as the Gauss-Jordan algorithms and LU decomposition, can also be used.

In step S25, the comparison between the normal vector of the eye coordinate and the PCCI value corresponding to each face of the polygon is performed. In step S26, according to the comparison result, the determination whether the angle between the normal vector of a face and the normal vector of the eye coordinate is larger than a pre-determined value (e.g. 90 degrees) is performed. In step S27, if the angle is equal to or larger than the pre-determined value, it indicates that the face is a front face. And then the face is rendered in the model space according to the vertex data in the vertex buffer and the index values in the index buffer. In step S28, if the angle is smaller than the pre-determined value, it indicates that the face is a back face. Then the face is removed from the model space without rendering.

For example, as illustrated in FIG. 7, when the normal vector of the eye coordinate belongs to quadrant A, the faces with PCCI values A, AB, and AD are back faces. When the normal vector of the eye coordinate belongs to quadrant B, the faces with PCCI values B, AB and BC are back faces. When the normal vector of the eye coordinate belongs to quadrant C, the faces with PCCI values C, BC, and CD are back faces. When the normal vector of the eye coordinate belongs to quadrant D, the faces with PCCI values D, AD and CD are back faces, and the other faces are front faces. When the normal vector of the eye coordinate belongs to quadrant AB, the faces with PCCI values AB, A and B are back faces, and the other faces are front faces. When the normal vector of the eye coordinate belongs to quadrant BC, the faces with PCCI values BC, B and C are back faces, and the other faces are front faces. When the normal vector of the eye coordinate belongs to quadrant CD, the faces with PCCI values CD, C and D are back faces, and the other faces are front faces. When the normal vector of the eye coordinate belongs to quadrant AD, the faces with PCCI values AD, A and D are back faces, and the other faces are front faces.

Hence, as illustrated in FIG. 7, when the normal vector of the eye coordinate belongs to quadrant B, the faces $f_2$, $f_3$ and $f_4$ are rendered, and faces $f_0$ and $f_1$ are removed without rendering.

Figure 8:
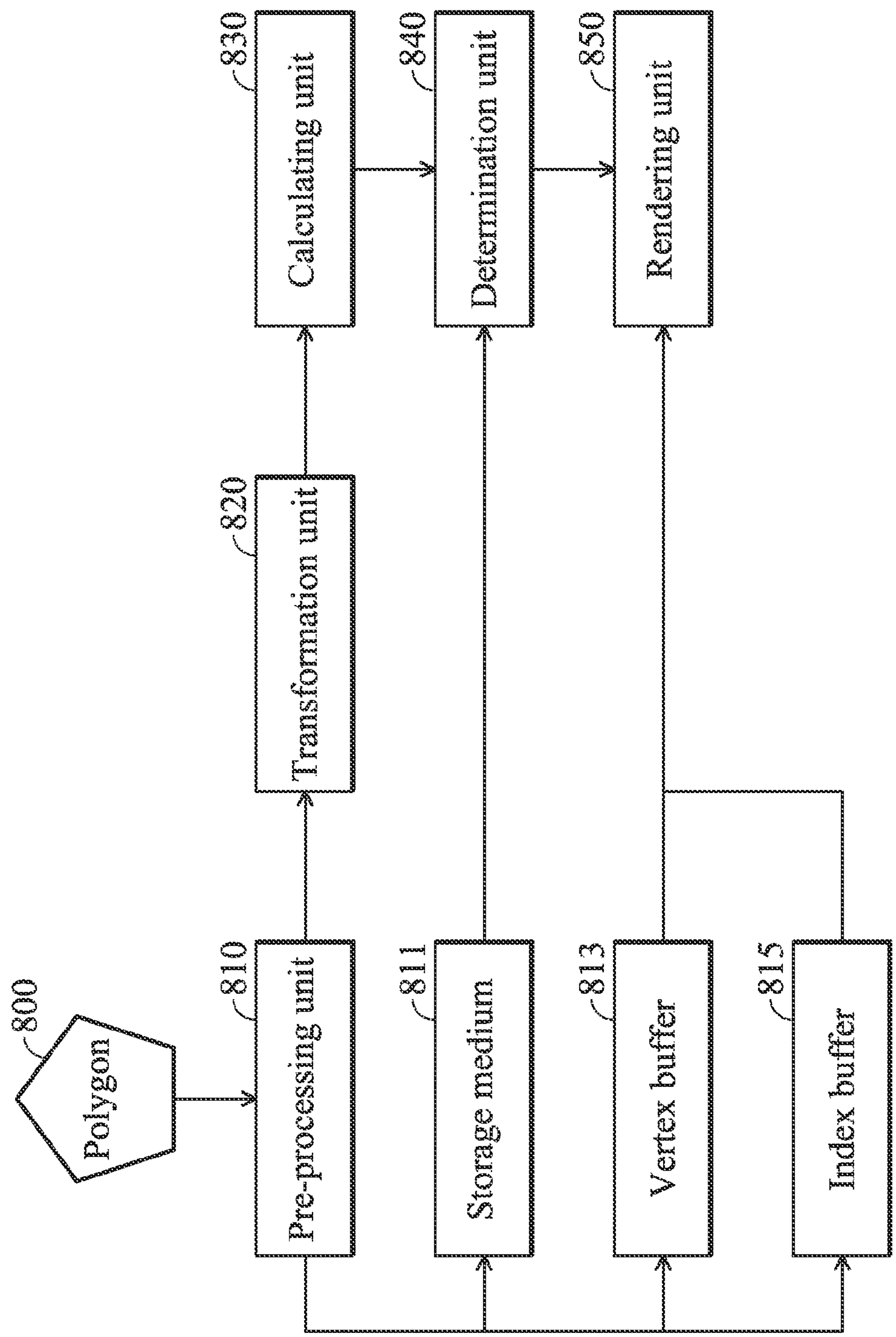
FIG. 8 illustrates a block diagram of the pre-culling system for the hidden surface removal of image objects according to an embodiment of the invention.

FIG. 8 illustrates the block diagram of the pre-culling hidden surface removal system according to one embodiment of the invention. According to an embodiment of the invention, the pre-culling system for the hidden surface removal system of image objects comprises a pre-processing unit 810, a transformation unit 820, a calculating unit 830, a determination unit 840 and a rendering unit 850.

The pre-processing unit 810 defines multiple quadrants for the polygon 800 in a model space according to the direction of the normal of each face, calculates the normal vectors of each face of the polygon 800 by a cross operation, and executes a normalization operation to each normal vector. After the normalization operation, the pre-processing unit 810 classifies the normal vector of each face according to the defined quadrants to obtain the PCCI values corresponding to the normal vector of each face, and generates a PCCI array. The PCCI array is stored in the storage medium 811. The vertex data corresponding to each face of the polygon 800 are stored in the vertex buffer 813. The index values corresponding to the vertex data of the polygon 800 are stored in the index buffer 815.

When performing a rendering operation, the transformation unit 820 transforms the eye coordinate from the eye space to the model space of the polygon 800. The calculating unit 830 calculates the normal vector of the eye coordinate in the model space to determine which quadrant of the polygon 800 the normal vector of the eye coordinate belongs to. The determination unit 840 compares the normal vector of the eye coordinate with the PCCI value of each face of the polygon 800 to determine whether the angle between the normal vector of the face and the normal vector of the eye coordinate is larger than a pre-determined value (e.g., 90 degrees).

If the angle is equal to or larger than the pre-determined value, it indicates that the face is a front face, and the rendering unit 850 renders the face in the model space according to the vertex data in the vertex buffer 813 and the index values in the index buffer 815. If the angle is smaller than the pre-determined value, it indicates that the face is a back face, and the rendering unit 850 removes the face without rendering.

Conventionally, when rendering a polygon object in a 3D scene, the polygon object is rendered with a fixed eye location and with the polygon object moving in the 3D scene. In the invention, the proposed method renders the polygon object with a fixed polygon object location and with the eyes moving in the 3D scene. The proposed method determines that each face of the polygon object relative to the eyes is a front face or a back face by a pre-processing operation, and the coordinate transformation and lighting procedures can be eliminated to reduce real-time calculation operations while rendering the polygon object.

The pre-culling system and method for the hidden surface removal of image objects, or certain aspects or portions thereof, may take the form of program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A pre-culling method for the hidden surface removal of image objects, comprising:

transforming an eye coordinate from an eye space to a model space of a polygon when performing a rendering operation; and comparing a normal vector of the eye coordinate in the model space with the normal vector of each face of the polygon to determine whether each face of the polygon with respect to the eye coordinate is a front face or a back face.

2. The pre-culling method as claimed in claim 1, wherein when an angle between the normal vector of the face of the polygon and the normal vector of the eye coordinate is smaller than a pre-determined value, the face is not drawn in the model space.

3. The pre-culling method as claimed in claim 2, wherein when the angle is larger than or equal to the pre-determined value, the face in the model space is rendered according to vertex data corresponding to the polygon in a vertex buffer and index values corresponding to the vertex data of the polygon in an index buffer.

4. The pre-culling method as claimed in claim 1, further comprising:

executing a pre-processing operation to obtain quadrants of the polygon and a PCCI array, wherein the PCCI array comprises PCCI values corresponding to the normal vector of each face of the polygon;

calculating the normal vector of the eye coordinate in the model space; and comparing the normal vector of the eye coordinate with the PCCI value corresponding to each face of the polygon.

5. The pre-culling method as claimed in claim 4, wherein the steps of the pre-processing operation further comprising:

defining the quadrants according to a direction of normal of each face of the polygon in the model space;

calculating the normal vectors of each face of the polygon by a cross operation;

executing a normalization operation to the normal vectors of each face of the polygon; and classifying the normal vector of each face of the polygon after the normalization operation according to the quadrants to obtain the PCCI values corresponding to the normal vector of each face of the polygon, and generating the PCCI array.

6. The pre-culling method as claimed in claim 1, further comprising:

executing an inverse transformation operation to transform the eye coordinate from the eye space to the model space of the polygon.

7. A non-transitory computer-readable medium storing a computer program, wherein the computer program comprises a plurality of program codes for loading into a computer system, said plurality of program codes when executed by a processor execute a pre-culling method for the hidden surface removal of image objects, the method comprising:

transforming a eye coordinate from a eye space to a model space of a polygon when executing a rendering operation;

comparing a normal vector of the eye coordinate in the model space with a normal vector of each face of the polygon to determine whether each face with respect to the eye coordinate is a front face or a back face; and removing the face in the model space without rendering when the face of the polygon is determined as the back face.

8. The non-transitory computer-readable medium as claimed in claim 7, further comprising:

executing a pre-processing operation to obtain quadrants of the polygon and a PCCI array, wherein the PCCI array comprises PCCI values corresponding to the normal vector of each face of the polygon;

calculating the normal vector of the eye coordinate in the model space; and comparing the normal vector of the eye coordinate with the PCCI value corresponding to each face of the polygon.

9. The non-transitory computer-readable medium as claimed in claim 8, wherein the pre-processing operation further comprises:

defining the quadrants of the polygon in the model space according to a direction of normal of each face;

calculating the normal vector of each face by a cross operation;

executing a normalization operation to each normal vector; and classifying the normal vector of each face according to the quadrants after the normalization operation to obtain the PCCI value corresponding to the normal vector of each face, and generating the PCCI array.

10. The non-transitory computer-readable medium as claimed in claim 7, further comprising:

rendering the face in the model space when the angel between the normal vector of the face and the normal vector of the eye coordinate is larger than or equal to a pre-determined value; and removing the face from the model space when the angel is smaller than the pre-determined value.

11. The non-transitory computer-readable medium as claimed in claim 10, wherein when the angle is larger than or equal to the pre-determined value, the face in the model space is rendered according to vertex data corresponding to the polygon in a vertex buffer and index values corresponding to the vertex data of the polygon in an index buffer.

12. The non-transitory computer-readable medium as claimed in claim 7, further comprising:

executing an inverse transformation operation to transform the eye coordinate from the eye space to the model space of the polygon.

* * * * *